United States Patent [19]

Sugiyama

[11] Patent Number: 5,267,037
[45] Date of Patent: Nov. 30, 1993

[54] INTERFRAME-CODED OUTPUT DATA AMOUNT CONTROL SYSTEM

[75] Inventor: Kenji Sugiyama, Yokosuka, Japan

[73] Assignee: Victor Company of Japan, Ltd., Yokohama, Japan

[21] Appl. No.: 814,377

[22] Filed: Dec. 27, 1991

[30] Foreign Application Priority Data

Dec. 28, 1990 [JP] Japan .................. 2-417571

[51] Int. Cl.⁵ ............................................ H04N 7/137
[52] U.S. Cl. ..................................... 358/136; 358/133
[58] Field of Search ............................... 358/136, 133

[56] References Cited

U.S. PATENT DOCUMENTS

| | | | |
|---|---|---|---|
| 4,982,285 | 1/1991 | Sugiyama | 358/136 |
| 4,984,076 | 1/1991 | Watanabe et al. | 358/136 |
| 4,985,768 | 1/1991 | Sugiyama | 358/136 |
| 5,016,010 | 5/1991 | Sugiyama | 375/122 |
| 5,063,608 | 11/1991 | Siegel | 358/133 |
| 5,089,889 | 2/1992 | Sugiyama | 358/136 |
| 5,103,307 | 4/1992 | Sugiyama | 358/136 |
| 5,144,424 | 9/1992 | Savatier | 358/136 |
| 5,144,426 | 9/1992 | Tanaka et al. | 358/136 |

FOREIGN PATENT DOCUMENTS 2-62887  3/1990  Japan .

*Primary Examiner*—Tommy Chin
*Assistant Examiner*—Bryan S. Tung

*Attorney, Agent, or Firm*—Jacobson, Price, Holman & Stern

[57] ABSTRACT

A video signal having a group of frames of successive dependent frames and an independent frame following the dependent frames is coded per group of frames, by interframe and intraframe coding, and a data amount of the group is controlled by feedback and feed forward control. A quantization step number for the dependent frames is changed based on a total data amount of the group and a data amount of the dependent frames for the feedback control. A temporary quantization number of the independent frame is determined for the feed forward control. A data amount predictive value for each block in the independent frame is determined by an activity of an image in each block and the temporary number of quantization steps. The predictive value is subtracted from the total data amount. A subtraction result for each block is accumulated to output a positive compensation amount if the result is a positive amount and a negative compensation amount if the result is a negative amount. The compensation amount is then added to the temporary number of quantization steps to obtain a number of quantization steps for the independent frame. The data amount of the group is thus controlled by quantizing the dependent and independent frames by the numbers of quantization steps of the dependent and independent frames, respectively.

3 Claims, 4 Drawing Sheets

INTERFRAME-CODED OUTPUT DATA AMOUNT CONTROL SYSTEM

BACKGROUND OF THE INVENTION

The present invention relates to high-efficiency coding systems that use a smaller amount of coding to efficiently code signals in recording, transmission and display apparatus that perform the processing of digital signals. More particularly, it relates to a coded output data amount control system that makes uniform the amount of data which is coded and output.

One high-efficiency coding system that is conventionally known uses variable length coding so that the data amount per sampling is made smaller. In this high-efficiency coding system, prediction error signals obtained by predictive coding or orthogonal transform coefficient signals obtained by orthogonal transform have a significant amount of discrepancy in the level distribution of these signals.

When coding is performed using codes that have different lengths (variable length codes such as Huffman codes) in accordance with the frequency of generation of the signal level, the average value for the coding length becomes shorter when compared to the case where fixed length codes are used.

When the variable length codes are used, it is possible to greatly reduce the data amount for the larger the discrepancies in the generation frequency of data. In addition, when compared to the case where the fixed length codes are used, the average data amount by the variable length codes can be made smaller while maintaining the same quality for reproduced signals.

However, the data amount by the variable length codes is not constant and so when it is desired that a data amount for each predetermined certain division be constant, it is necessary to control the amount of generated data so as to make it constant.

One general system of data amount control is feedback control by a data output buffer. This reduces the number of quantization steps and makes the data amount smaller when the amount of coded data has increased and the amount of data that is stored in the buffer has become large. Control systems such as this are used in systems for television conference and the like that perform continuous signal processing.

However, in case of the recording and reproduction of video signals to and from a storage and recording medium such as a recording disk or recording tape or the like, it is necessary to have a reproduction function in special reproduction modes (such as slow motion reproduction, high-speed reproduction and the like) in addition to the normal reproduction mode. In this case, image data that is to be made the object should desirably be divided into divisions of single units such as for each one-frame cycle, and such that the data amount is constant. When there is the editing of image data that has been coded, replacing image data requires that the data length be fixed in unit of each field cycle to several frame cycles.

In cases such as these, this type of feedback control maintains the average value for the data amount at a constant value and so the data amount cannot be accurately stored within a constant value of a desired unit.

The same inventor as of the present invention has already proposed in Japanese Patent Application No. 62887-1990 applied for on Mar. 14, 1990, a data amount control system that makes the data amount to within a constant value.

With the system disclosed in this Japanese Patent Application, the activity of the orthogonal transform coefficients obtained by orthogonal transform of incoming signals is first obtained. This activity is a quantity that expresses the degree of change of an image (and is small for when there is a small portion of the image which is the same, and large for when there is a large portion of the image which is complex), and is determined by the mean square of the alternating coefficients that express the spatial frequency components of luminance of pixels inside one block obtained by orthogonal transform (where one block is a group of a predetermined number of pixels of an original image).

This activity is used as the basis for determining a temporary quantization step so that the data amount inside one frame becomes constant. This is feed forward control.

Furthermore, this activity is used as the basis for determining the predictive data amount for each block. The predictive data amount is subtracted from the data amount for each actual block obtained by quantization of the orthogonal transform coefficients and variable length coding thereof thus quantized, and this result is then accumulated. The accumulated result is used as the basis to change the quantization step. By adding this changed quantization step and the temporary quantization step, a final quantization step is obtained which is used for quantization of the orthogonal transform coefficients. This is feedback control. Moreover, with this system, the orthogonal transform coefficients are stored once in a coefficient memory for the purpose of compensation of delay by feed forward control, and these stored orthogonal transform coefficients are quantized.

Because of feed forward control, it is necessary to have a memory for the coefficients or a frame memory of from one to several frame portions which are the units for which the data amount is to be made a constant value.

When the feed forward and feedback controls described above are used for interframe coding having independent frames at constant intervals, such as disclosed in U.S. Pat. No. 4,985,768 issued on Jan. 15, 1991, by the same inventor of this invention, an output data amount of an interval of the independent frames is desirably constant. Memories for four to six frames are thus required for compensation of a delay due to feed forward control. In such coding in which an output data amount is controlled, an ideal data amount of each frame changes largely with the degree of motion of an image and the quality of the image deteriorates if the amount of data for one frame is fixed.

SUMMARY OF THE INVENTION

In light of this problem, the present invention has as an object the provision of a coded output data amount control system that can fix the amount of data at an interval of independent frames, while at the same time maintaining a high coding efficiency.

According to the present invention, a coding system for coding a video signal having a group of frames including a predetermined number of successive dependent frames and an independent frame which follows the dependent frames to obtain coded data of the group of frames, by interframe and intraframe coding, and for controlling a data amount of the group of frames by feedback control and feed forward control by means of an activity expressing a degree of change of an image in each of blocks composed of a predetermined number of pixels in the independent frame, the system comprising first processing means for changing a number of quantization steps for the dependent frames on the basis of a rate of a total data amount of the group of frames and a data amount of the dependent frames for the feedback control; second processing means for determining a temporary number of quantization steps of the independent frame for the feed forward control; block data prediction means for determining a data amount predictive value for each of the blocks in the independent frame by means of the activity and the temporary number of quantization steps; subtraction means for subtracting the data amount predictive value from the total data amount and outputting a subtraction result for each of the blocks; quantizing step control means for accumulating the subtraction result for the blocks and outputting a positive quantization step compensation amount if the subtraction result is a positive amount and a negative quantization step compensation amount if a negative amount; and addition means for adding the compensation amount to the temporary number of quantization steps to obtain a number of quantization steps for the independent frame, wherein the data amount of the group of frames is controlled by quantizing the dependent and independent frames by means of the numbers of quantization steps of the dependent and independent frames, respectively.

The second processing means comprises activity detection means for detecting the activity; and control means for obtaining an object data amount of the independent frame by subtracting the data amount of the dependent frames from a predetermined total data amount of the group of frames, and obtaining a first data amount of the independent frame by means of the activity and a middle number of quantization steps of predetermined 2 to m'th power numbers, m being a positive integral number, to compare the data amount of the independent frame with the object amount, if the former being greater than the latter, thus shifting the middle number to less by half among the predetermined numbers, if the former being smaller than the latter, thus shifting the middle number to more by half among the predetermined numbers, so as to determine a first number of quantization steps, and obtaining a second data amount of the independent frame by means of the activity and the first number of quantization steps, to compare the second data amount and the object amount, if the former being greater than the latter, thus shifting the first number of quantization steps to less by half among the predetermined numbers, if the former being smaller than the latter, thus shifting the first number of quantization steps to more by half among the predetermined numbers, the comparison process being repeated m times at most, so as to determine a number of quantization steps by which the data amount of the independent frame becomes nearest to the object amount, as the temporary number of quantization steps.

The system further comprises an activity memory for storing the activity until the coding of the dependent frames is completed.

Other objects and advantages of the present invention will become apparent from the detailed description to follow taken in conjunction with the appended claims.

DESCRIPTION OF THE PREFERRED EMBODIMENT

Figure 1:
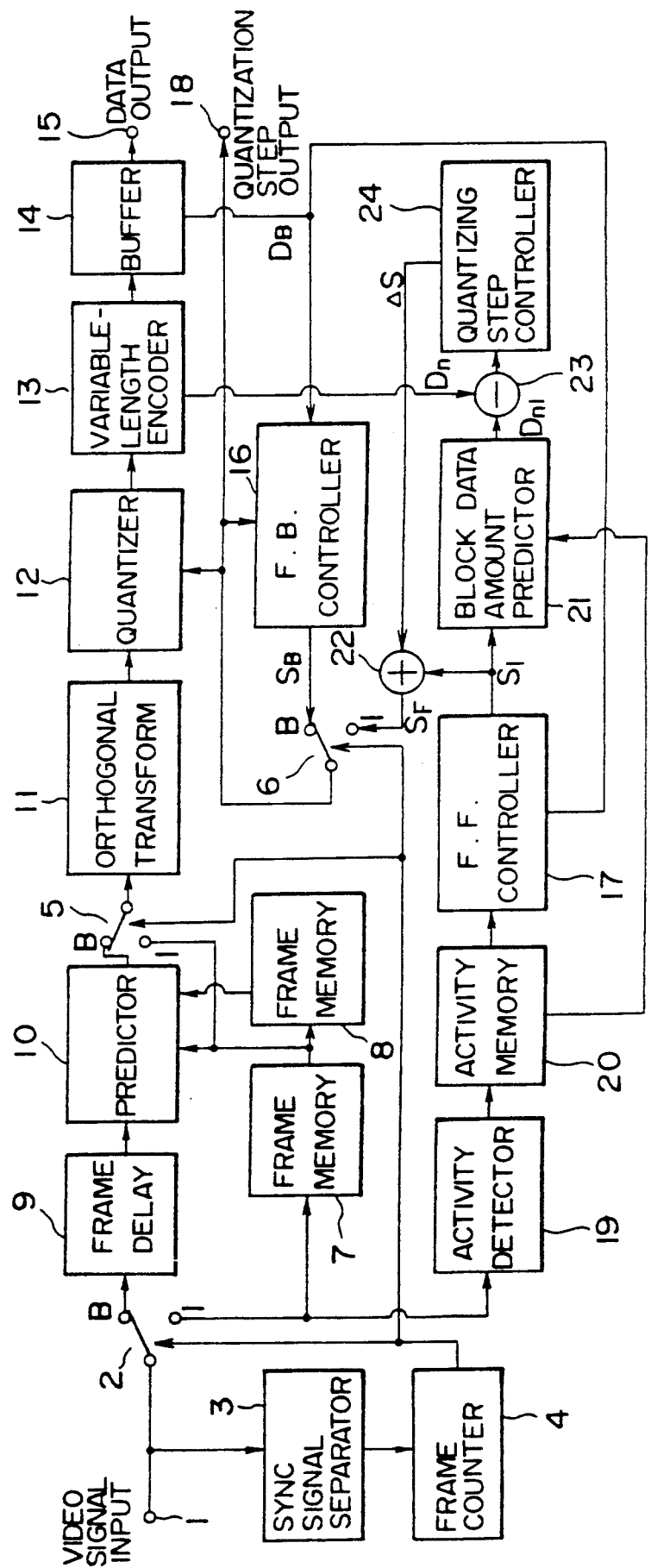
FIG. 1 is a block diagram showing one embodiment of a coding apparatus of an interframe-coded output data amount control system of the present invention.

FIG. 1 is a block diagram showing one embodiment of a coding apparatus of an interframe coded output data amount control system of the present invention.

In FIG. 1, video signals incoming from an image input terminal 1 are supplied to a switch 2 and a synchronizing signal separator 3. The synchronizing signal separator 3 separates vertical (frame) synchronizing signals from the input video signals and supplies the vertical synchronizing signals to a frame counter 4.

If an independent frame interval of the input video signals is N, then the frame counter 4 counts N number of the vertical synchronizing signals and obtains frame numbers, and supplies the frame numbers to switches 2, 5 and 6, to control the switching of independent and dependent frames. The switches 2, 5 and 6 are thrown to the B side for the dependent frames and to the I side for the independent frame.

For an independent frame, a video signal incoming from the image input terminal 1 is supplied from the switch 2 to a frame memory 7 and stored. A video signal that has been stored in the frame memory 7 up till that time is moved to another frame memory 8 and stored.

For a dependent frame, a video signal incoming from the image input terminal 1 is supplied from the switch 2 to a frame delay 9 and is delayed by N frame portions, and is supplied to a predictor 10. In the predictor 10, the video signals of the independent frames each supplied from the frame memories 7 and 8 are used to perform prediction of an input video signal to obtain a predictive error signal. The predictive error signal is supplied to an orthogonal transformer 11 via the switch 5 for intraframe coding.

The timing of intraframe coding of one independent frame is when the next independent frame is input. The output of the frame memory 7 is used for the intraframe coding of the independent frame.

The orthogonal transformer 11 converts the input video signal into orthogonal transform coefficients for each block of 8×8 pixels. The orthogonal transform method is a known method such as discrete cosine transform (DCT) or the like. One orthogonal transform coefficient is a DC coefficient (mean) and all other orthogonal transform coefficients are AC coefficients (alternating). The coefficients that are the output signals of the orthogonal transformer 11 are supplied to a quantizer 12.

The quantizer 12 quantizes the output signals of the orthogonal transformer 11 by a quantization step that is set by a method to be described later. Output signals of the quantizer 12 are supplied to a variable length encoder 13. In the variable length encoder 13, each of the coefficients is converted into a Huffman code or the like that has been set beforehand. Output signals of the variable length encoder 13 are supplied to a buffer 14. The variable length encoder 13 also outputs an actual data amount $D_n$ which is to be described later.

The buffer 14 is a FIFO (First In First Out) memory by which an input data rate changes along with the amount of data that is output from the variable length encoder 13 and the output rate of the data that has been stored once in the buffer 14 is converted into a constant rate. Efficiently coded image data is then output via a data output terminal 15. The buffer 14 also supplies a data amount $D_B$ of the dependent frame to a F.B. (feedback) controller 16 and a F.F. (forward feed) controller 17. The F.B. controller 16 performs feedback control with respect to the dependent frames described later, and obtains a quantization step $S_B$ for the dependent frames, which is supplied to the switch 6. The switch 6 switches the quantization step $S_B$ for the dependent frames and a quantization step $S_I$ for the independent frames described later. Either step is supplied to the quantizer 12 and the F.B. controller 16, and also is output via an output terminal 18.

The independent frame is also supplied to an activity detector 19 via the switch 2 and the activity is determined for each block. The activity is supplied to an activity memory 20 and is stored therein until the coding of the dependent frame ends. The activity is then supplied to the F.F. controller 17.

The F.F. controller 17 determines a temporary quantization step $S_I$ on the basis of the activity. The activity that is stored in the activity memory 20 is also supplied to a block data amount predictor 21, with the temporary quantization step $S_I$, where a data amount prediction value $D_{nI}$ for each block is determined.

In a subtractor 23, the data amount prediction value $D_{nI}$ is subtracted from the actual data amount $D_n$ supplied by the variable length encoder 13, and a difference $(D_n - D_{nI})$ is supplied to the quantization step controller 24.

The quantization step controller 24 stores the difference $(D_n - D_{nI})$ and determines a compensation amount $\Delta S$ depending upon the size of the difference $(D_n - D_{nI})$ and supplies the amount $\Delta S$ to an adder 22.

The temporary quantization step $S_I$ determined by the F.F. controller 17 is also supplied to the adder 22 and the quantization step $S_1$ and the compensation amount $\Delta S$ are added to each other to determine a final quantization step $S_F$ of the independent frame. The final quantization step $S_F$ is supplied to the switch 6.

The following is a description of the feedback control of the data amount of the dependent frame, which is a feature of the present invention. The feedback control with respect to the dependent frame is performed by the F.B. controller 16 shown in FIG. 1.

In order to maintain a balance of dependent frame image quality and independent frame image quality, this control is performed so that the ratio of the respective quantization steps is a constant ratio without forcibly fixing the data amount of the dependent frame to a constant amount.

When this is done, the data amount changes greatly according to the degree of motion of an image. However, in the prediction of a dependent frame using preceding and subsequent independent frames of the present invention, the prediction efficiency is high and the prediction error is slight. In addition, it is difficult for image quality deterioration to occur even if the quantization step is coarse because the prediction is non-recursive prediction. The coded data amount is thus sufficiently small even if there is an image that has a relatively large amount of motion, and can normally be made one tenth that of the independent frames.

Accordingly, if the interval N of independent frames is about 4, then the data amount of the dependent frames is about three tenths that of an entire data amount. Even if it is assumed that the data amount of the dependent frames has increased to 1.5 times, the data amount that can still be allotted to the independent frames is reduced to about 80%. More specifically, the data amount of the dependent frames is small and so even if it does change, there is little influence on the entire data amount.

Figure 2:
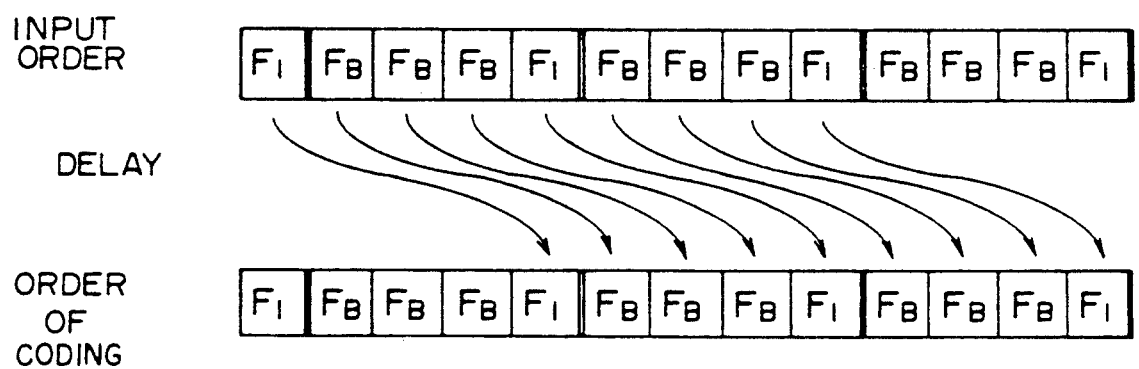
FIG. 2 is a view describing the coding order.

FIG. 2 is a view describing the coding order in the present invention. In FIG. 2, $F_I$ is an independent frame and $F_B$ is a dependent frame, and the interval (N) of the independent frames is 4. Each N frame delimited by thick lines in FIG. 2 is a unit for which the respective data amounts are made constant. Each frame is delayed by N frames and coded. With the present invention, the data amount is fixed to a constant amount by coding of the independent frame after the dependent frames coded in each N frames and so the end point of the independent frame coded becomes a delimiter. This unit is called a GOF (Group Of Frames.)

Dependent frame control is performed by maintaining a constant quantization balance between independent frames and dependent frames and the following is a specific description of this.

In a data amount of a GOF that has already been coded immediately prior to a GOF that is about to be coded, the data amount of dependent frames is made $D_B$ and the data amount of an independent frame is made $D_I$, and a total data amount of the GOF is made $D_T$. Also, the dependent frame quantization step is made $S_B$, the independent frame quantization step is made $S_I$, and equation (1) expresses the ideal balance relationship between $S_B$ and $S_I$. The constant k is normally about 2.

$$S_B = k\, S_I \tag{1}$$

Here, control to reduce the number of quantization steps is performed if there is an increase in the data amount and if the data amount has a relationship of inverse proportion to the quantization step, and if $\alpha$ and $\beta$ are inversely proportional constants, then the relationship becomes as shown in equations (2) through (4) below.

$$D_B = \alpha/S_B \tag{2}$$
$$D_I = \beta/S_I \tag{3}$$
$$D_T = D_B + D_I \tag{4}$$

Here, $S_B$ and $S_I$ do not necessarily have the relationship $S_B = kS_I$ and so equations (1) through (4) are used as follows in order for the dependent frame quantization step $S_{B1}$ of the next GOF to have that relationship with the independent frame quantization step.

$$D_T = \alpha/S_{B1} + k\beta/S_{B1} \tag{5}$$
and from equation (5),
$$S_{B1} = (\alpha + k\beta)/D_T \tag{6}$$

and equation (6), substituting the $\alpha$ and $\beta$ obtained from equations (2) and (3) gives $$S_{BI} = D_B \times S_B + k \times D_I - S_I)/D_T \quad (7)$$

and determines $S_{BI}$ from the $D_B$, $D_I$, $S_B$ and $S_I$ of the previous GOF.

When equation (7) is changed into the form of equation (8) below, $$S_{BI} = S_B - (S_B - kS_I) D_I/D_T \quad (8)$$

then it is possible to express $S_{BI}$ in a form where it is a modification of $S_B$. When $S_B = kS_I$, the portion of the equation inside the parentheses becomes zero, and $S_B$ can be used as it is.

Here, it was assumed for the sake of simplicity that the relationship between the data amount and the quantization step is inversely proportional but if a more realistic function is used, then it is possible to perform more suitable control. This setting of $S_{BI}$ is necessary to perform for the vertical (frame) synchronizing interval from the end of the previous GOF processing until the start of the next GOF processing. However, if a simple equation such as equation (8) is satisfactory, then it is possible for this to be calculated by a microprocessor. This processing is performed by the F.B. controller 16 in FIG. 1.

Moreover, the dependent frame quantization step $S_B$ being basically constant for inside the GOF but when there is the possibility that the data amount $D_B$ of the dependent frame becomes extremely large and the data amount of the independent frames becomes extremely small, then feedback control can be performed on the $S_B$ within the frame unit or finer units. The method for doing this is similar to general feedback control.

In cases such as these, the quantization step $S_B$ for the dependent frame is not constant and so the quantization step $S_I$ for the independent frames to be described later can change finely by feedback control. More specifically, the $S_B$ and $S_I$ of the previous GOF that was necessary for the setting of the $S_B$ described above, can be easily obtained by using their initial values but can be determined more accurately by their mean values. The calculation of these mean values is performed by a processor for equation (8).

The following is a description of control of the data amount of the independent frame, which is another feature of the present invention.

The dependent frame quantization step $S_B$ is set by the dependent frame control described above, and when the dependent frame coding ends, the dependent frame data amount $D_B$ of that GOF is definite. The total data amount $D_T$ of that GOF, to which the data amount is to be fixed is set in the F.F. controller 17, where the data amount $D_I$ of the independent frame that is the object is determined by $(D_T - D_B)$. Feed forward control is performed with respect to $(D_T - D_B)$ but in order to do this, it is necessary to determine the activity for each block ($8 \times 8$ to $16 \times 16$ pixels) that forms the unit for later feedback control.

As described before, the activity is a quantity that expresses the degree of change of an image, so any kind of quantity which corresponds to change of an amount of data is available. Many examples of the activity have been known. The U.S. Pat. No. 5,016,010 by the same inventor of this invention discloses the normalization information D as the activity which is obtained by normalizing the difference between the maximal and minimal values of the AC coefficients by the DC coefficient.

Before orthogonal transform, it is possible to determine the activity prior to intraframe coding if the AC coefficients are taken by a BPF (Band Pass Filter) or the like. The independent frame is delayed by N frames and so it is not necessary to have an additional memory if activity detection is performed during that interval. Moreover, if there is provided another orthogonal transformer for activity detection besides the transformer 11 for intraframe coding, then there will be the same characteristics as for activity detection after the orthogonal transform.

The activity is a value in each block unit and so the capacity of the memory is extremely small when compared to that of the frame memory.

Here, after the data amount $D_I$ of the independent frame that is the object is set, the temporary quantization step $S_I$ for the independent frame needs to be determined in the F.F. controller 17 during vertical (frame) synchronization before the coding for the independent frames commences.

Assumption is made that there are 32 ($= 2^5$) kinds of quantization steps. This enables there to be a step width of 6 times (the 31st power of $1.06 = 6.09$) using an index change of 6% per time, and for there to be a sufficient number of step kinds. The respective kinds of quantization steps have numbers 1 through 32 appended to them, with "No. 1" denoting the finest. First, in the step No. 16, the independent frame data amount $D_I$ is estimated by means of the activity and the quantization step is shifted by half, that is it is shifted by 8 to step No. 8 if that amount is smaller than an objective value (data amount that is the object) D, or to step No. 24 if it is larger.

A shift amount A becomes $8 \rightarrow 4 \rightarrow 2 \rightarrow 1$ in the data amount calculations for five quantization steps, and the quantization step No. $S_I$ is obtained for which the data amount is smaller than and is the closest to the objective value D. More specifically, if the number of the step kinds is the m'th power of 2 (m being a positive integral number) the quantization step No. $S_I$ can be determined by m number of data amount calculations.

Figure 3:
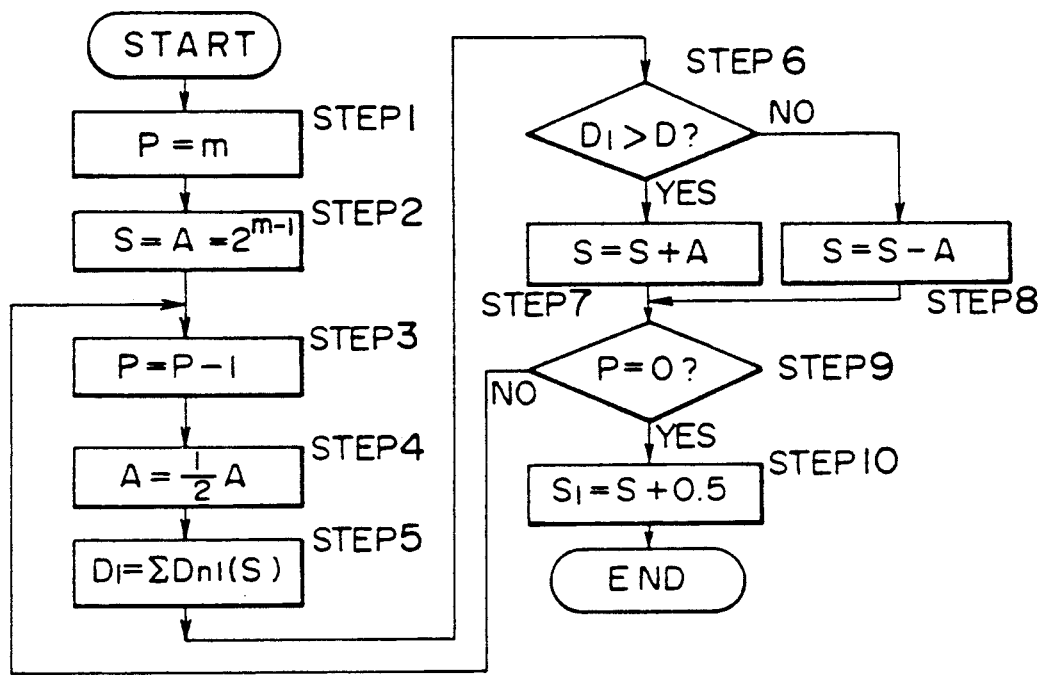
FIG. 3 is a flow chart of setting process for the temporary quantization step.

FIG. 3 is a flowchart of the processing for the setting of the temporary quantization step (step number). A is the shift amount, $D_{n}(S)$ is the predictive code data amount of the n'th block for the quantization step of No. S, $\Sigma D_{n}(S)$ is the frame total for $D_{n}(S)$.

In FIG. 3, when there is start, first p=m (in step 1). Then, the quantization step No. S and the shift amount A are both made equal to the (m−1)th power of 2. Then, p is made p−1 (step 3) and the shift amount A is halved (step 4). $\Sigma D_{n}(S)$ which is the frame total of the predictive data amount in the quantization step No. S iS made the data amount $D_I$ (step 5). Then, it is judged for whether or not the data amount $D_I$ is greater than the objective value (the objective data amount that is the object) D (step 6) and if it is larger, then the shift amount A is added to the quantization step No. S (step 7), and if it is less, then the shift amount A is subtracted from the quantization step No. S (step 8), to obtain a new quantization step No. S. Then, it is judged whether p is 0 or not (step 9) and if it is not 0, the process returns to the step 3. If P is 0, 0.5 is added to the new quantization step No. S, 0.5 being a compensation amount in consideration of the quantization error, this addition result is set as the temporary quantization step No. $S_1$ (step 10) and the process ends.

The F.F. controller 17 supplies the temporary quantization step No. $S_1$ determined in this manner to the block data amount predictor 21 and the adder 22. The block data amount predictor 21 calculates a data amount predictive value $D_{nl}(S_1)$ for each block by means of the temporary quantization step No. $S_1$, and the activity for each block and which is supplied from the activity memory 20, and supplies the predictive value $D_{nl}(S_l)$ to the subtractor 23. Prediction of the data amount by means of the activity is made on the basis of the mean relative relationship between the activity and data amount, both being actually detected. This relationship can be stored in a table of a ROM, and is then referred when the prediction is made, as disclosed in the U.S. Pat. No. 5,016,010. The subtractor 23 subtracts the data amount predictive value $D_{nl}(S_1)$ from the actual data amount $D_n$ supplied by the variable length quantizer 13 and supplies a difference $(D_n - D_{nl}(S_1))$ to the quantization controller 24. The quantization step controller 24 stores the difference $(D_n - D_{nl}(S_1))$ for each block and accumulates the difference for every block. If the accumulated difference becomes positive, this shows that the data amount is too large and so the positive quantization step compensation amount $\Delta S$ for coarsening the quantization step is generated, and the negative compensation amount $\Delta S$ if negative, and the compensation amount $\Delta S$ is supplied to the adder 22. In the adder 22, the compensation amount $\Delta S$ is added to the temporary quantization step $S_1$ by feedback control for each block, and the quantization step $S_F$ for the independent frame is finally determined. The final quantization step $S_F$ is then supplied to the switching switch 6.

Figure 4:
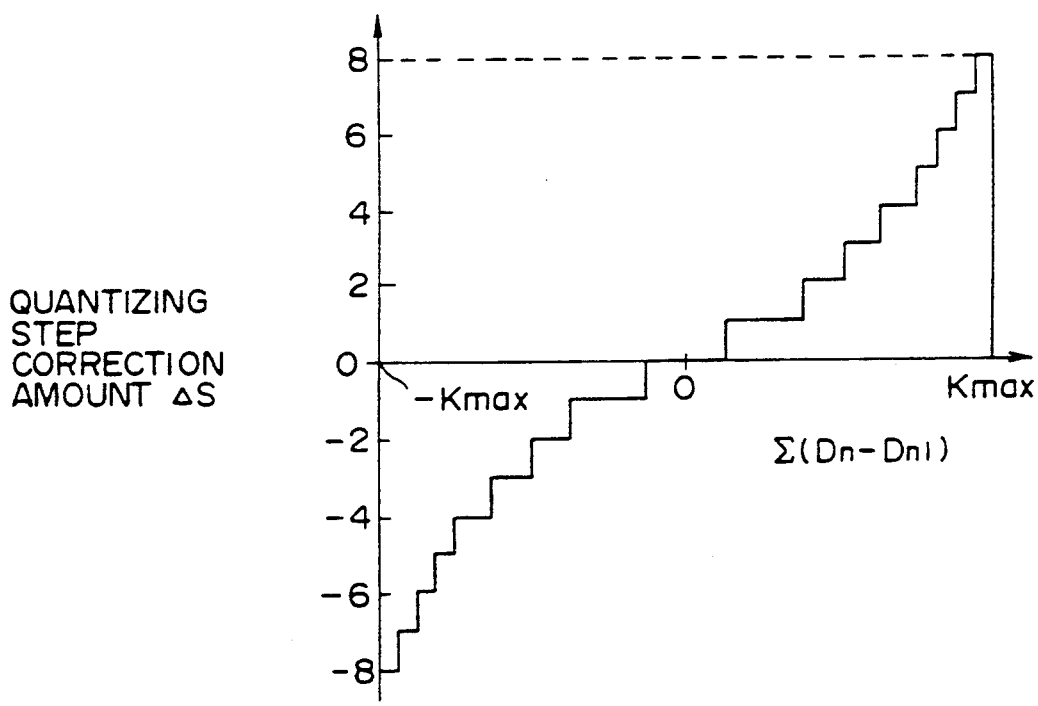
FIG. 4 is a view describing quantization step control characteristics.

FIG. 4 is a view showing the quantization step control characteristics. The horizontal axis shows $\Sigma(D_n - D_{nl})$ and the vertical axis shows the compensation amount $\Delta S$. In FIG. 4, $\pm k_{max}$ is the feedback control tolerance, and the control is made so that $\Sigma(D_n - D_{nl})$ does not exceed $\pm k_{max}$. If the control is suitably performed, then the final quantization error of a frame will be less than $\pm k_{max}$ and so the feedback control can be set so that it has a tolerance of $\pm k_{max}$ with respect to the data amount that actually has to be limited. $k_{max}$ has a data amount of 1 to 2 block portions, so that there is an extremely small loss.

Figure 5:
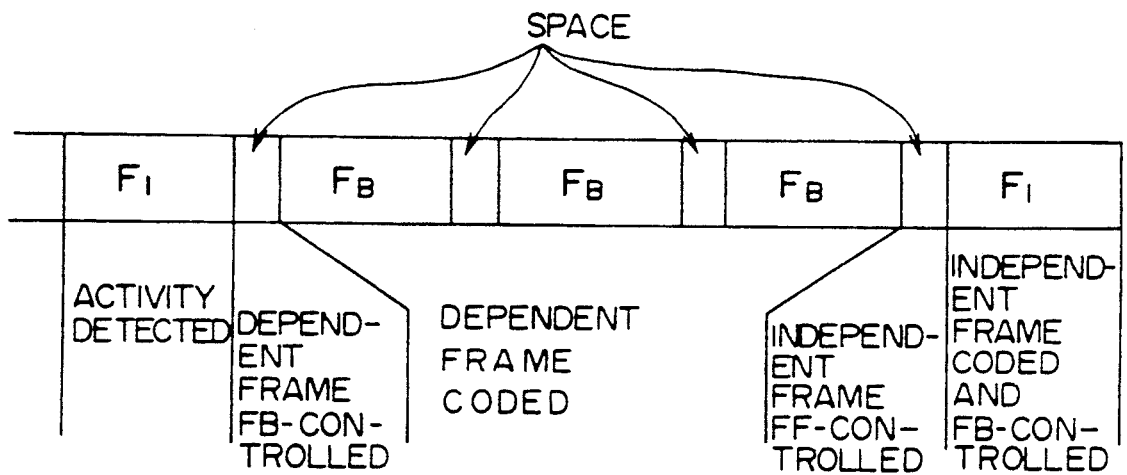
FIG. 5 is a view describing the control process timing.

The following is a description of the timing for what has been described above. FIG. 5 is a view showing the control processing timing. In the same manner as FIG. 2, FIG. 5 has $F_I$ expressing the independent frames and $F_B$ expressing the dependent frames. The spaces between $F_I$ and $F_B$, and $F_B$ and $F_B$ are the vertical (frame) synchronizing divisions, and in the case of NTSC signals and the like, are time of about 8% of a single frame cycle (the vertical synchronizing cycle+even field scanning cycle+vertical synchronizing cycle+odd field scanning cycle). When only one of even and odd fields is made a frame for low data rate coding, the time of more than half of a single frame cycle is equivalent to this space.

The series of control processing is delimited at the end point of an independent frame. First, feedback control of dependent frames is performed in the first synchronizing division in a GOF unit, and this is followed by coding of the dependent frames. At the end stage of the coding of the dependent frames, there is the start of feed forward control for an independent frame, and this ends within that synchronizing division. Finally, coding processing for the independent frame is performed while discrepancies in the feed forward control are absorbed by feedback by means of the quantization step compensation amount $\Delta S$, and the discrepancies are contained within the slight error at the end of coding. At the end of the independent frame coding, the data amount of GOF is fixed to a constant data amount.

For the activity of each block necessary for feedback control of independent frames, has a new activity value can be written in the memory 20 from which the activity value for feedback control of an independent frame of the GOF one prior has been called.

Figure 6:
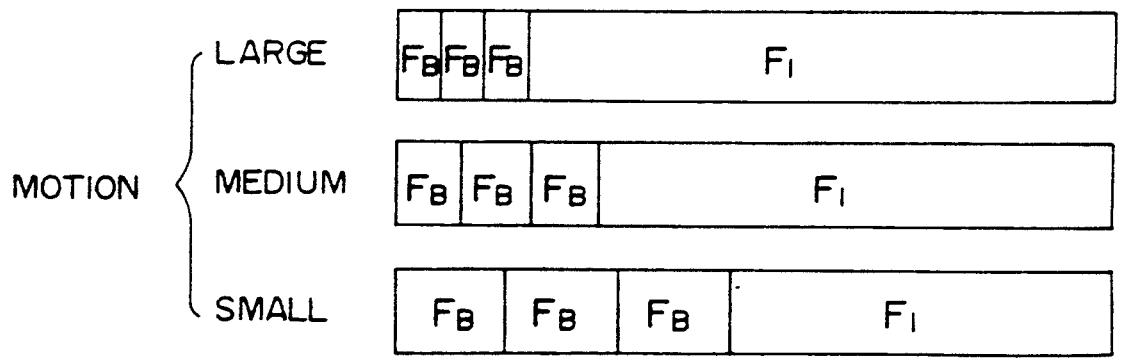
FIG. 6 is a view describing the division of the data amount due to motion.

FIG. 6 is a view showing the proportion of the data amount due to motion. In FIG. 6, only the proportion of the dependent frames and independent frame changes in accordance with the degree of motion. The data mount for dependent frames changes greatly according to the movement of the image and is larger for the larger the intensity of the motion. In cases such as these, it is easy for motion blur to occur in the image, and there are many cases where the data amount of independent frames that have been coded by intraframe coding can be made smaller.

Moreover, in the embodiment shown in FIG. 1, the F.B. controller 16 for dependent frames and the F.F. controller 17 for independent frames are provided separately. Both the processing of the controllers can also be performed by a microprocessor or a digital signal processor. In addition, since the processing timing for feed forward control and feedback control are different, it is also possible to use one controller for both.

Also, in this embodiment, the system fixes the data amount of an independent frame to a constant amount using a combination of feed forward control and feedback control. However, it is not absolutely necessary to have feedback control for fixing the data amount, as there is also the method where $D_n$ can be made less than $D_{nl}$ by partially truncating the data of a block when the actual data amount $D_n$ is greater than the data amount predictive value $D_{nl}$ for each block. In this case, the surplus data makes no large loss since it is added to the next $D_{nl}$. The data truncation can be realized by Stopping the zig-zag scan when there is the coding of the orthogonal transform coefficient.

According to the present invention, the feedback control is performed on dependent frames on the basis of the data of already coded frames. While, the feed forward control is performed on an independent frame following the dependent frames to fix a data amount of the independent frame to the amount which is given by subtracting the data amount of the dependent frames from an actual data amount of a group of frames. The total data amount of the group of frames thus can be fixed to a constant amount.

There is no need to have an additional frame memory for the feed forward control. In FIG. 1, the independent frame is stored in the frame memory 7 until the interframe coding of the dependent frames is completed and the independent frame is then coded. Thus, the frame memory 7 for the interframe coding also can be used for the feed forward control.

Furthermore, the data amount of the group of frames can be fixed to a constant amount at an interval of the independent frames, while at the same time maintaining a high coding efficiency. Thus, the present invention can be applied to storage media and the like.

What is claimed is:

1. A coding system for coding a video signal having a group of frames including a predetermined number of successive dependent frames and an independent frame which follows the dependent frames to obtain coded data of the group of frames, by interframe and intraframe coding, and for controlling a data amount of the group of frames by feedback control and feed forward control by means of an activity expressing a degree of change of an image in each of blocks composed of a predetermined number of pixels in the independent frame, the system comprising:

first processing means for changing a number of quantization steps for the dependent frames on the basis of a total data amount of the group of frames and a data amount of the dependent frames for the feedback control;

second processing means for determining a temporary number of quantization steps of the independent frame for the feed forward control;

block data prediction means for determining a data amount predictive value for each of the blocks in the independent frame by means of the activity and the temporary number of quantization steps;

subtraction means for subtracting the data amount predictive value from the total data amount and outputting a subtraction result for each of the blocks;

quantizing step control means for accumulating the subtraction result for each of the blocks and outputting a positive quantization step compensation amount if the subtraction result is a positive amount and a negative quantization step compensation amount is a negative amount; and addition means for adding the compensation amount to the temporary number of quantization steps to obtain a number of quantization steps for the independent frame, wherein the data amount of the group of frames is controlled by quantizing the dependent and independent frames by means of the numbers of quantization steps of the dependent and independent frames, respectively.

2. A system according to claim 1, wherein the second processing means comprises:

activity detection means for detecting the activity; and control means for obtaining an object data amount of the independent frame by subtracting the data amount of the dependent frames from a predetermined total data amount of the group of frames, and obtaining a first data amount of the independent frame by means of the activity and a middle number of quantization steps of predetermined 2 to the power of m, m being a positive integral number, to compare the data amount of the independent frame with the object amount, if the data amount of the independent frame is greater than the object amount, thus increasing the middle number by half among the predetermined numbers, if the data amount of the independent frame is smaller than the object amount, thus decreasing the middle number by half among the predetermined numbers, so as to determine a first number of quantization steps, and obtaining a second data amount of the independent frame by means of the activity and the first number of quantization steps, to compare the second data amount and the object amount, if the second data amount is greater than the object amount, thus increasing the first number of quantization steps by half among the predetermined numbers, if the second data amount is smaller than the object amount, thus decreasing the first number of quantization steps by half among the predetermined numbers, the comparison process being repeated m times at most, so as to determine a number of quantization steps by which the data amount of the independent frame becomes nearest to the object amount, as the temporary number of quantization steps.

3. A system according to claim 1, further comprising an activity memory for storing the activity until the coding of the dependent frames is completed.

* * * * *